United States Patent [19]

Tabares

[11] 4,398,758

[45] Aug. 16, 1983

[54] PROTECTIVE GUARD DEVICES FOR USE WITH AUTOMOTIVE VEHICLES

[76] Inventor: Gilbert Tabares, 7244 Redlands, Apt. H-3029, Playa del Rey, Calif.

[21] Appl. No.: 273,977

[22] Filed: Jun. 15, 1981

[51] Int. Cl.³ .............................................. B60R 13/00
[52] U.S. Cl. ........................................ 293/128; 70/18; 296/188
[58] Field of Search ......................... 280/770; 292/347; 70/18; 296/188; 233/132, 133, 128

[56] References Cited

U.S. PATENT DOCUMENTS 3,472,546 10/1969 Samuels ................................ 293/128
4,325,238 4/1982 Scherbing ................................ 70/18

Primary Examiner—Joseph F. Peters, Jr.
Assistant Examiner—John A. Carroll

[57] ABSTRACT

A removable protective guard device for use with an automotive vehicle having a metal wall, such as a side wall. The protective device is comprised of a first plate and second and third plates extending from opposite edges of the first plate in a somewhat U-shaped configuration. The first, second and third plates are preferably formed of a plastic material and are integral with each other. Extending from the opposite edges of the second and third plates are angularly located attaching elements which are capable of conforming to the shape of the side wall of the vehicle. Moreover, the attaching elements are provided with a magnetic means in the form of a magnetic material incorporated into the attaching means so as to be removably attachable to the side walls of the automotive vehicle. When attached to the vehicle, these protective devices protect the side wall of the vehicle from damage by a foreign object which might impact with the metal wall of the vehicle. The protective guard device is constructed so that it is capable of being attached to surfaces of differing automotive vehicles having varying surface configurations. Further, the guard device is capable of protecting the surface to which it is attached from impact by doors or other foreign objects, such as doors of other vehicles when the door of such other vehicle could impact from a number of different positions depending on the position of such other vehicle.

4 Claims, 9 Drawing Figures

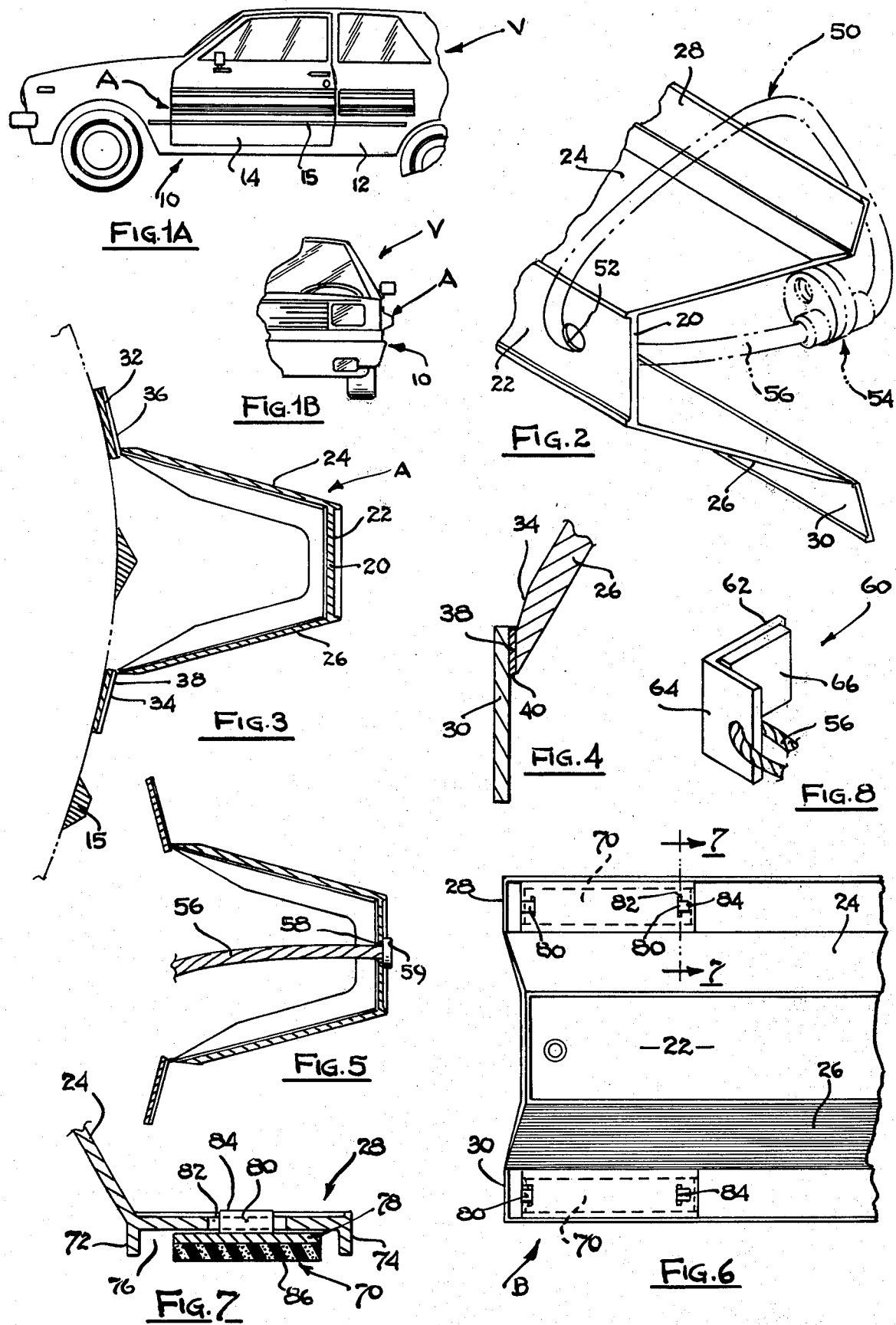

PROTECTIVE GUARD DEVICES FOR USE WITH AUTOMOTIVE VEHICLES

BACKGROUND OF THE INVENTION

1. Field of The Invention

This invention relates in general to certain new and useful improvements in protective guard devices for use with automotive vehicles, and more particularly, to protective guard devices which have one wall spaced from the metal wall of the vehicle and a releasable attaching element which is capable of conforming to the wall of the vehicle and magnetically attaching the device thereto.

2. Brief Description of the Prior Art

There have been several proposed devices for protecting the side walls of vehicles, as for example, conventional passenger automotive vehicles and the like. One form of protective guard device relies on the use of permanently attached strips containing resilient members which are adapted to receive the impact of a foreign object as for example, the door of another vehicle. In this way, the door of the other vehicle is prevented from engaging the door of the vehicle having the protective strip. However, unless the protective strip is positioned at the desired height, with respect to each possible impact, then it is not effective. Moreover, and in particular, with respect to sports cars, high cost foreign vehicles and the like, these protective strips are often not employed due to the fact that they are deemed to create an unsightly appearance and detract from the desired appearance of the vehicle.

In view of the fact that certain sports vehicles and similar vehicles do not include permanently attached protective strips, there has been proposed certain removable protective guard devices for use with such vehicles. These protective guard devices are adapted for attachment to the side wall of the vehicle and also include a magnetic means so that they may be removably attached. These protective devices usually include a leather strip or a somewhat resilient strip such as a plastic strip which is attached to the vehicle and which is also provided with a magnetizing member for attachment thereto. These devices are removable, and they are also flexible for purposes of folding and storage. Nevertheless, the portion of the device which receives the impact is always in contact with the side wall of the vehicle. Thus, if a foreign object, such as a door from another vehicle, is impacted into this protective guard with any substantial degree of force, then the impact will transfer through the protective device and thereby dent or scratch the finish of the vehicle which the protective device is designed to protect. Consequently, these protective devices have not been terribly effective.

One of the principal problems with any of the door protective strips which were heretofore proposed was the fact that such protective strips were not capable of protecting the door or other portion of the vehicle side wall unless a plurality of such strips were employed. This was due to the fact that the side wall of the vehicle for which the device was to be used was curved or otherwise had a shape other than flat. Thus, even if the strips were positioned at one location, e.g. one height for example, it might not protect the side wall from impact by another vehicle door having a protruding edge at a differing height. The problem was significant in view of the fact that one could not take into consideration the shape and therefore possible impact points from doors of other vehicles. Some vehicles have an impact point higher than other vehicles when the door is opened. This problem is also compounded by the fact that the impact point may differ depending on the angle of impact. Consequently, any such protective strips which were heretofore available or proposed were not effective for their intended purposes.

There have also been certain proposed identification markers for automotive vehicles which utilize a plastic body section and a rim having a magnetizing member for removable attachment to the vehicle. These devices are typically adapted for attachment to the roof of the vehicle for purposes of identification. One such identification marker is more fully illustrated in U.S. Pat. No. Des. 217,038 to John H. Cleave.

OBJECTS OF THE INVENTION

It is, therefore, a primary object of the present invention to provide a protective door device which is capable of being attached to a large number of vehicle side walls having differing shapes and curvatures to protect such side wall against impact from a foreign object, such as the door of another vehicle.

It is another object of the present invention to provide a protective guard device of the type stated which is capable of protecting a vehicle side wall from impact points at different heights.

It is a further object of the present invention to provide a protective guard device of the type stated which is capable of protecting a vehicle side wall from impact by the door of another vehicle which may have different impact points depending on the angle of impact.

It is also an object of the present invention to provide a protective guard device for use with the metal walls of automotive vehicles and which includes one plastic plate spaced from the side wall of the vehicle it is designed to protect and a second plate extending therefrom and an attaching element capable of being magnetically attached to the metal wall of the vehicle.

It is yet another object of the present invention to provide a removable protective guard device of the type stated in which the attaching element is a somewhat resilient attaching element formed of a rubber material for purposes of conforming to a metal side wall of the vehicle having various contours therein.

It is an additional object of the present invention to provide a protection guard device of the type stated having magnetic elements shiftably mounted to attaching strips to enable attachment to a vehicle having side walls of differing contours.

It is another salient object of the present invention to provide a removable protective guard device of the type stated which is provided with a somewhat U-shaped construction and also with a pair of attaching elements capable of being magnetically removably attached to the metal walls of the vehicle.

It is still another object of the present invention to provide a protective guard device of the type stated which can be constructed at a very low cost and which is also highly effective in its operation for protecting the automotive vehicles.

With the above and other objects in view, my invention resides in the novel features of form, construction, arrangement, and combination of parts presently described and pointed out in the claims.

BRIEF SUMMARY OF THE DISCLOSURE

A removable protective guard device for use with automotive vehicles having metal walls, as for example, metal side walls.

The device is constructed so that it has an impact wall positioned with respect to the surface to which it is attached to thereby protect the vehicle regardless of the degree of curvature or other shape of the surface. Thus, the device is capable of being used on a wide variety of vehicles having differing surface configurations to which the device would be attached and is designed to protect. Further, the device is capable of protecting the surface to which it is attached from impact by doors of other vehicles which have different impact points and which might impact the surface to which the device is attached from different impact angles.

The device in one aspect of the invention typically comprises a first plate preferably formed of a plastic material and which is adapted to be spaced from the metal wall of the automotive vehicle on which the device is used. This first plate also has an outer surface which is located to receive the impact of a foreign object, as for example, a door of another vehicle and thereby protect from damage the metal wall of the vehicle on which it is used.

In a more specific aspect of the present invention, the metal wall of the vehicle may be the side wall of an automotive vehicle. In this respect, the term "side wall" is deemed to include any side panel of the vehicle which may be a permanent side panel of the vehicle capable of not moving with respect to the vehicle or, for example, a side panel of the door which is capable of moving with respect to the remaining portion of the vehicle.

In a preferred embodiment of the present invention, a second plate extends from one edge of the first plate and a third plate extends from the opposite edge of the first plate in angular relationship thereto. In addition, the angle of the second plate with respect to the first plate and the angle of the third plate with respect to the first plate is substantially similar so that the first, second and third plates form a somewhat U-shaped construction. In addition an attaching element similar to the previously described attaching elements is also located on an edge of the third plate for attachment to the metal wall of the automotive vehicle.

In one embodiment of the present invention, the attaching elements are formed of a somewhat resilient material so as to be capable of conforming to the side wall of the vehicle with which it is used. Thus, the attaching elements may be formed with a rubber material and have a magnetically treated substance therein. For example, the magnetically treated substance may well be magnetically oriented powders such as ferromagnetic powders and the like which are impregnated in the rubber flexible attaching elements. In addition, the attaching elements may be adhesively attached to edges of the respective second and third plates.

In another embodiment of the invention, the attachment elements may be formed of a rigid material and may be of the same material from which the first and second and third plates are formed. Even more-so, the attachment elements may be integral with the respective second and third plates. In this embodiment, the attachment elements are provided with recesses on the sides thereof facing the metal wall of the vehicle. Further, a shiftable member is retained in each of the recesses and such shiftable member has a magnetic means to be magnetically attachable to the side wall of the vehicle. The slight shiftable movement of this shiftable member enables the latter to conform to the curvature of the side wall or other portion of the vehicle to thereby enable the device to be used with a large number of vehicles having different shaped side walls.

In still another embodiment of the present invention, means may be provided for releasably locking the protective guard device to the automotive vehicle. This means for releasably locking may comprise a cable which is capable of being locked around the vehicle door handle. The means for releasably locking may also comprise a cable which is capable of being located between a door of a vehicle and a door jamb of that vehicle. In this way, when the user wishes to remove the device from the vehicle, it is possible to merely release the lock and remove the cable from the door handle. In the arrangement where the cable is located between the door and the door jamb, when the door is unlocked and opened, the cable will be released and the device can be easily removed.

This invention possesses many other advantages and has other purposes which may be made more clearly apparent from a consideration of the forms in which it may be embodied. These forms are shown in the drawings forming part of and accompanying the present specification. They will now be described in detail for the purposes of illustrating the general principles of the invention, but it is to be understood that such detailed descriptions are not to be taken in a limiting sense.

BRIEF DESCRIPTION OF DRAWINGS

Having thus described the invention in general terms, reference will now be made to the accompanying drawings in which:

FIG. 1B is the front elevational view and FIG. 1A is the side elevational view of an automotive vehicle with removable protective guard devices of the present invention attached thereto;

FIG. 2 is a fragmentary perspective view showing the protective guard device of the present invention;

FIG. 3 is an end elevational view of the protective guard device of the present invention;

FIG. 4 is an enlarged end elevational view showing one means of securing a flexible attaching element to a portion of the protective guard device;

FIG. 5 is an end elevational view, similar to FIG. 3, and showing a cable element for releasably locking the device to an automotive vehicle;

FIG. 6 is a fragmentary top plan view of a modified form of protective guard device constructed in accordance with and embodying the present invention;

FIG. 7 is a sectional view taken along line 7—7 of FIG. 6; and

FIG. 8 is a perspective view of a hook which is used on one end of a cable forming part of the protective guard device of the present invention.

DETAILED DESCRIPTION OF PREFERRED EMBODIMENTS

Referring now in more detail and by reference characters to the drawings which illustrate preferred embodiments of the present invention, V designates an automotive vehicle with which the protective guard device A of the present invention may be used. In this particular case, the automotive vehicle is shown as having a vehicle body 10 with a side panel 12. Further, a door 14 providing for exit and entrance to the interior passenger compartment is hingedly mounted on the body 10. The remaining portions of the vehicle are conventional and not critical with respect to the present invention, and are therefore, neither illustrated nor described in any further detail herein.

With respect to the protective guard devices of the present invention, it should be understood that these devices could be used with any form of automotive vehicle and are not necessarily limited to passenger vehicles as such; although they are highly effective for use with passenger vehicles and particularly those which do not include permanently attached protective guard devices. Thus, the protective guard devices of the present invention may be used with trucks, jeeps, boats, airplanes, or other forms of automotive type vehicles. The guard devices are highly effective in providing protection from impact of foreign objects, such as doors of other vehicles, which often results in dents, scratches and the like.

In the embodiment of the invention as illustrated in FIG. 1 of the drawings, it can be observed that two protective devices A are shown on the side wall of the automotive vehicle. In this respect, the side wall is deemed to include that body side wall 12 as well as the side panel of the door 14 inasmuch as the door itself, while being openable and closable, is nevertheless contiguous with the side wall of the vehicle and therefore deemed to be part of the side wall of this vehicle. In addition, the doors on most automotive type vehicles are typically provided with a handle mechanism and which typically includes a handle element which has a portion connected to and spaced from the door itself so as to form an opening therebetween.

The protective guard devices A comprise a first plate 20 which is typically spaced apart from the side wall, as for example, the door 14 of the automotive vehicle. This plate 20 is provided with an outer surface 22 adapted to receive the impact of any foreign object, as for example, the edge of a door of another automotive vehicle. Moreover, since it is spaced from the metal wall, as for example, the door 14 of the vehicle, it may receive the impact of such foreign object and even may be somewhat resilient so as to yield to the impact of this foreign object, but without contacting the metal wall of the door or the portion of the vehicle. Thus, the vehicle side wall itself if protected from the impact of such foreign objects.

Integrally attached to the upper edge of the first plate 20 is a second plate 24 which is angularly located to the first plate 20 and is preferably located at an angle of about 75 degrees thereto. In a more preferred aspect of the invention, a third plate 26 is secured to the opposite longitudinal edge of the first plate 20 and also extends therefrom at an angle of about 75 degrees. However, the second plate 24 and the third plate 26 could extend at an angle ranging from 5 degrees with respect to the plane of the plate 20 to about 38 degrees with respect to the plane of the plate 20.

The second plate 24 and the third plate 26 are preferably integral with the first plate 20. Further, and in still more a preferred aspect of the invention, the first, second and third plates are all formed of a suitable plastic material as for example, a high impact polyethylene material. It should be understood in connection with the present invention that other forms of plastic materials may be employed and which include for example, many of the vinyladiene cloride polymers and copolymers, various styrene monomers and polymers, butadyne polymers and co-polymers, polypropylene, various other polyalephatic compounds and the like.

While the protective guard devices of the present invention are preferably formed of plastic materials, this is deemed to include reinforced plastic composite materials, which include for example, the various hardenable resins and filimentary materials. An example of such reinforced plastic composite materials may be fiberglass or similar fiber metal such as boron or carbon metals impregnated with a suitable resin matrix as for example, any of a number of well known thermosetting resins or the like. Notwithstanding, it should be understood while the plastics, including the reinforced plastic composite materials, are preferred in connection with the present invention, that the protective guard devices could be formed of other materials including various metals, wood, and other known structural materials.

Secured to the outermost edge of the second plate 24 is a somewhat resilient attaching element 28. In like manner, secured to the free edge of the plate 26 is a second somewhat resilient attaching element 30 and which is similar to the attaching element 28. In a more preferred aspect of the invention, it can be observed that the second plate 24 is provided with a tapered end portion 32 and in like manner, the third plate 26 is similarly provided with a tapered end portion 34. Each of these end portions 32 and 34 also preferably merge into relatively flat outer edges 36 and 38 respectively. The somewhat resilient attaching elements 28 and 30 are therefore attached to the respective outer edges 36 and 38. Moreover, the edges 36 and 38 are located in a plane so that the attaching elements 28 and 30 may be angulated with respect to the first plate 20, that is, they are not necessarily parallel to the plane of the plate 20, as best illustrated in FIG. 3 of the drawings.

The somewhat resilient attaching elements extend for the length of the associated plates 24 and 26. Moreover, these attaching elements 28 and 30 are preferably formed of a rubberized material so as to be sufficiently resilient and flexible. In this way, they are capable of conforming to the contour of the side wall (including the door) of the automotive vehicle on which they are used. Thus, for example, the resilient attaching elements may be formed by any known number of rubber materials as for example, neoprene rubber or the like. As indicated previously, these somewhat resilient attaching elements may be provided with means for magnetically attaching the device to the side wall of the automotive vehicle or other metal wall of the vehicle. While the magnetic attaching means may adopt the form of rigid permanent magnets, it is not absolutely necessary in accordance with the present invention.

It is generally desirable to use some form of magnetic attachement means in order to avoid the necessity of drilling holes or otherwise permanently destroying the overall outer appearance of the metal side wall of the motor vehicle on which the protective device is to be used. Thus, in one of the forms of the present invention, the resilient attaching means may be formed of a rubber material as for example, a neoprene rubber, or the like, and may be impregnated with various magnetized materials. Thus, the magnetizing materials may adopt the form of particulate magnetizing metals which may be impregnated in the rubber material. Thus, the rubber material may function as the somewhat resilient attaching elements and may also include the magnetic means, namely the magnetically attractive metal particles therein. The somewhat resilient attaching elements are commercially available in the form of rubber strips which have magnetically attractive material therein and which are produced in a commercially known manner.

By reference to FIG. 3 of the drawings, it can be observed that the protective guard device is disposed over a protective strip on a side wall of a vehicle. It can also be appreciated that the protective strip conventionally provided with the vehicle provides little protection to the side wall of the vehicle. The protective guard device of the present invention on the other hand extends for a substantial distance outwardly of the side wall of the vehicle and provides a substantially greater degree of protection.

These attachment elements, such as the attachment elements 28 and 30, may be secured to the plastic plates 24 and 26 by means of an adhesive layer 40, in the manner as illustrated in FIG. 4 of the drawings. This adhesive layer 40 may adopt the form of any conventionally known adhesive which is sufficient for attaching a rubber strip, such as the rubber adhesive attachment element 30, to the tapered edge 34 of the plate 26. Various known adhesives are available for this purpose. However, it should be understood that any conventional form of securing the attachment element 30 to the plate 26 and for that matter, the attachment element 28 to the plate 24, may well be employed. In one of the more specific aspects of the present invention, it is desirable to taper the outer edges of the plates 24 and 26 in the manner as more fully illustrated in FIGS. 3 and 4 of the drawings.

It is possible to provide a releasable locking means for releasably locking the protective guard device to the metal wall of the automotive vehicle in order to prevent stealing or otherwise unauthorized removal therefrom. In one embodiment, the locking means adopts the form of a cable 50, more fully illustrated in phantom lines in FIG. 2, and is capable of extending through an aperture 52 formed in the first plate 20, also in the manner illustrated in FIG. 2. This cable 50 is provided with a locking element 54 which may be provided with a typical padlock or the like. The cable 50 is designed to extend through the aperture 52 and also around the handle 18 of a conventional automotive type vehicle. Thus, when the lock 54 is locked, unauthorized removal is prevented. However, the user who is authorized to remove this device, may easily insert a key, operate a combination as for example, in a combination lock, or the like, and open the lock 54 and thereby remove the cable 50. In this way, the protective guard device of the present invention may be removed from the automotive vehicle. This is desirable particularly with sports vehicles for purposes of transportation and when the vehicle is not parked.

Another form of the locking mechanism which may also be used with the protective guard device of the invention is more fully illustrated in FIG. 5. In this case, the protective guard device is provided with a cable 56 which extends through an aperture 58 formed in the plate 20. At its outer end, the cable 56 is provided with an abuttment head 59 which engages the outer surface of the plate 20. The cable 56 may be located between a door of the vehicle and the door jamb of that vehicle. Thus, when the door is closed, the cable 56 will be snugly engaged between the edge of the door and the door jamb, thereby preventing unauthorized removal of the cable 56 and hence, the removal of the protective device A. When a party having authorized possession of a key to the door of the vehicle is able to open the vehicle, then the cable 56 itself may be removed thereby permitting authorized removal of the protective guard device A. It should be understood that other forms of equivalent locking mechanisms may also be employed with the protective guard device of the present invention.

It is also possible to use a hook or so-called "clip" 60 on one end of the cable 56 in the manner as shown in FIG. 8 of the drawings. This clip 60 is designed to be located on the inside of the vehicle and is of L-shaped construction including a main plate 62 and an angularly located flange 64. The end of the cable 56 is permanently attached to the flange 64 in the manner shown. A magnet 66 may be located on the interiorly presented face of the plate 62 for magnetic attachment to a portion of the vehicle as for example the vehicle door. Any form of clip could be used for this purpose and any releasable attachment means could be used in place of the magnet 66.

FIGS. 6 and 7 illustrate another embodiment of a protective device B which uses a modified form of attachment means. The device B generally comprises the plate 22 along with the pair of outwardly struck angulated plates 24 and 26. Rigidly secured to the lower ends of each of the plates 24 and 26 are outwardly struck flanges 28 and 30, respectively. In this embodiment of the invention, the flanges 28 and 30 may be integral with or welded or otherwise rigidly secured to the outer edges of the respective plates 24 and 26. Each of the flanges 28 and 30 are provided at each of the opposite ends with an attachment means 70 which is more fully illustrated in FIG. 7 of the drawings. Further, in this embodiment of the invention, each of the flanges 28 and 30 are provided with downwardly struck legs 72 and 74 along each of their longitudinal margins, in the manner as illustrated in FIG. 7, and thereby form a recess 76 on the underside of the flanges 28 and 30.

It should be understood that only two such attachment means 70 are illustrated in FIG. 6 of the drawings with one being located on the underside of the flange 28 and one being located on the underside of the flange 30. In like manner, and in the preferred embodiment, additional attachment means would be located at oppsite ends of each of the flanges 28 and 30 and also preferably intermediate the ends of the flanges 28 and 30. However, it should be understood that any number of attachment means could be employed as desired.

The attachment means 70 also comprises a metal retaining plate 78 having upwardly struck tabs 80 which entends through elongate apertures 82 formed in the flange 28. The tabs 80 have refersely bent portions 84 in order to hold the plate 78 within the recess 76. Rigidly secured to the underside of the retaining plate 78 is a plastic layer 86 which is preferably impregnated with a magnetic powder, in the manner as previously described. Thus, this plastic layer 86, serves as the magnetic means for attaching the device to the side wall or other portion of an automotive vehicle.

This construction of the attachment means is highly effective in that the attachment means 70 is capable of some movement within the elongate recess 76. Thus, slight longitudinal shiftable movement is permitted and angulated movement with respect to the flange 28 is also permitted. In this way, the attachment means itself can more fully conform to the overall curvature of the vehicle such that the flange 28 and the flange 30 do not have to conform to the exact shape of the vehicle. It should be understood that all other attachment means in this embodiment would be similar to the one just previously described.

In one of the more preferred embodiments of the invention, the angle between the plate 20 and the plate 24 is about 105°. Further, the angle between the plate 24 and the attachment strip 28 is about 105°, and in like manner, the angle between the plate 26 and the attachment strip 30 is also about 105°.

Also in the preferred embodiment, the plate 20 has an overall height, that is the dimension between the plates 24 and 26, which is about four inches and a thickness of about 0.26 inches. Moreover, the corner portions between the plates 20 and 24 and the plates 20 and 26 are rounded. In addition, the plates 24 and 26 each have an overall dimension between the plate 20 and the associated attachment means of about four inches and a thickness of about 0.13 inches. The overall dimension between the edges of the plates 24 and 26, that is the distance between the points where the attachment strips 28 and 30 are located, is about four inches.

The overall length from transverse end to transverse end of each of the devices in accordance with the present invention is about 24 inches although this specific length could vary depending upon the kind of vehicle with which the devices are to be used.

The protective guard devices of the present invention may be placed in any desired location on the automotive vehicle. Typically, the protective devices A may be located on the doors of the vehicle and on the other portions of the side wall thereof. For that matter, the protective devices could also be located on the front or rear portions of the vehicle. Further, the protective devices may be made in any desired length, although, they are typically designed with lengths of two to four feet. Thus, they are easily attached and easily removed from the side wall portions of the automotive vehicle. In addition, due to the shortness of length, they may be easily stored in the vehicle passenger compartment or in the trunk of the vehicle when not in use.

Due to the fact that the protective guard devices have a flexible attaching means, as hereinbefore described, they can be attached to substantially any portions of the automotive vehicle.

Thus, two or more protective guard devices may be located in a horizontal alignment. Thus, any combination and arrangement of protective devices could be employed on the vehicle, in order to protect the vehicle from potential damage by any other foreign object.

When the user of the devices A attempts to park the vehicle, he or she can observe the conditions surrounding the vehicle and the possible impact and potential damage from any other source. Thus, the user can select and carefully position one or more protective guard devices of the present invention on the vehicle in order to reduce the possibility of damage from any other parked vehicle or any other foreign object.

It can be seen by virtue of the above outlined construction that the protective guard devices of the present invention can be used on doors or vehicle side walls having a wide variety of differing sizes and shapes since they are capable of conforming to such surface configurations. Further they are capable of protecting the vehicle side wall from impact of a foreign object such as another vehicle door since they protrude for a substantial distance outwardly from the wall they are designed to protect. It has been found that the impact surface should be spaced outwardly from the wall it is designed to protect, at the point of attachment, by a distance of about no less at least than three inches.

The protective guard devices are also effective in that they can protect the side wall from impact by a large number of differing vehicle doors which may have differing sizes and shapes. They are also effective to protect the side walls of the vehicle to which they are attached from impact by other vehicle doors which may have differing impact points depending on the angle from which they impact. It can be seen that due to the fact that the impact surface is fairly large and spaced a substantial distance from the vehicle, it is capable of being the first surface to receive any impact regardless of the shape of the other vehicle door or the impact angle.

It can be observed that the protective guard device of the present invention is highly effective for use with various forms of automotive vehicles having various sizes and shapes of side walls and other portions thereof. Moreover, the protective guard device is uniquely designed so that it will not mar or otherwise impair the finish of the outer surface of the vehicle. Nevertheless, it is capable of being removably attached thereto without the attendant fear of being unauthorizedly removed from the vehicle. Still, the protective guard device of the present invention is highly effective in preventing damage to the vehicle on which it is used.

Thus, the illustrated and described device fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications, which become apparent to those skilled in the art, after considering theis specification and the accompanying drawings, are deemed to be covered by the invention which is limited only by the following claims.

Having thus described my invention, what I desire to claim and secure by Letters Patent is:

1. A removable protective guard device for use with vehicles having metal wall section of any contour, said device comprising:

a generally U-shaped, hollow frame structure of a material capable of withstanding high impact forces, said frame structure including an impact receiving section and a pair of leg sections extending from opposite edges of said impact receiving section in angular relationship to said impact receiving section;

a pair of members for attaching said frame structure to said metal wall section, one of said attachment members being attached to each of said leg sections at an end thereof remote from said opposite edges of said impact receiving section, each of said attachment members extending outwardly away from the interior of said frame structure and each of said attachment members being angulated relative to said impact receiving section, said attachment members being comprised of a resilient and flexible material such that the attachment members are capable of conforming to the contour of said metal wall section; and faastening means associated with each of said attachment members for releaseably holding said frame structure in a desired position on said metal wall section.

2. The protective guard device of claim 1 wherein each of said attachment members has a tapered section at an end remote from said impact receiving section.

3. A removable protective guard device for use with vehicles having a door with a metal wall section of any contour, said device comprising:
- a generally U-shaped, hollow frame structure of a material capable of withstanding high impact forces, said frame structure including an impact receiving section and a pair of leg sections extending from opposite edges of said impact receiving section in angular relationship to said impact receiving section;
- a pair of members for attaching said frame structure to said metal wall section, one of said attachment members being attached to each of said leg sections at an end thereof remote from said opposite edges of said impact receiving section, each of said attachment members extending outwardly away from the interior of said frame structure and each of said attachment members being angulated relative to said impact receiving section, said attachment members being comprised of a resilient and flexible material such that the attachment members are capable of conforming to the contour of said metal wall section,
- fastening means associated with each of said attachment members for releasably holding said frame structure in a desired position on said metal wall section; and
- releaseable locking means for preventing unauthorized removal of said frame structure from the vicinity of the vehicle, said locking means including an angled locking segment immoveably coupled to said vehicle when said door is closed and a flexible cable segment connecting said locking segment to a portion of said frame structure.

4. The protective guard device of claim 3 wherein each of said attachment members has a tapered section at an end remote from said impact receiving section.

* * * * *